US012712748B2

(12) United States Patent
Krilakis et al.

(10) Patent No.: US 12,712,748 B2
(45) Date of Patent: Aug. 18, 2026

(54) PHYSICALLY UNCLONABLE FUNCTION (PUF) AUTHORITY FOR IDENTIFICATION TRUST IN COMMUNICATIONS WITH INTERNET OF THINGS (IoT) DEVICES

(71) Applicant: Eulambia Advanced Technologies Ltd., Athens (GR)

(72) Inventors: Konstantinos N Krilakis, Athens (GR); Dimitrios Syvridis, Cholargos (GR)

(73) Assignee: EULAMBIA ADVANCED TECHNOLOGIES LTD., Athens (GR)

( * ) Notice: Subject to any disclaimer, the term of this patent is extended or adjusted under 35 U.S.C. 154(b) by 57 days.

(21) Appl. No.: 18/988,651

(22) Filed: Dec. 19, 2024

(65) Prior Publication Data

US 2025/0365166 A1 Nov. 27, 2025

(51) Int. Cl.
*H04L 29/06* (2006.01)
*H04L 9/32* (2006.01)

(52) U.S. Cl.
CPC .................................. *H04L 9/3278* (2013.01)

(58) Field of Classification Search
None
See application file for complete search history.

(56) References Cited

U.S. PATENT DOCUMENTS 8,694,778 B2 4/2014 Teuwen
9,729,317 B2 8/2017 Pikus
10,521,616 B2 12/2019 Wallrabenstein
10,917,251 B2 * 2/2021 Satpathy ............... H04L 9/3278
11,956,376 B2 * 4/2024 Kim ...................... H04L 9/0822
12,184,797 B2 * 12/2024 Cambou ............... H04L 9/3268
2008/0112596 A1 * 5/2008 Rhoads ................... G06T 1/005 382/115
2014/0189890 A1 * 7/2014 Koeberl ................... G09C 1/00 726/34
2017/0063559 A1 3/2017 Wallrabenstein
2019/0026724 A1 1/2019 Wade
2019/0165954 A1 5/2019 Lu
2019/0305970 A1 * 10/2019 Satpathy ................. H04L 9/006
2020/0034549 A1 1/2020 Lu
(Continued)

FOREIGN PATENT DOCUMENTS

WO WO-2012122994 A1 * 9/2012 ............. G06F 21/45
WO WO-2020183035 A1 * 9/2020 ............... H04L 9/50
WO WO-2023212178 A1 * 11/2023 ........... H04L 9/0866

*Primary Examiner* — Jeffery L Williams
(74) *Attorney, Agent, or Firm* — CRGO Global; Steven M. Greenberg

(57) ABSTRACT

Physically unclonable function (PUF) enabling secure communications with a PUF enrolled device includes directing a PUF unit to acquire a PUF response to a on optical stimulus upon a physical random medium of the PUF unit for the enrollment, identification and secure communication with a device. The method additionally includes retrieving the PUF response from the PUF unit and generating a secure hash identifier (SHI) from the PUF response, from which a digital certificate may be created with the SHI. Finally, the method includes storing the SHI, digital certificate and PUF response in a record of a registry in connection with the device for use in a subsequent authentication of the device by a communicating client in order to establish a secure tunnel between the communicating client and the device.

15 Claims, 3 Drawing Sheets

(56) References Cited

U.S. PATENT DOCUMENTS

| | | | | |
|---|---|---|---|---|
| 2020/0067708 | A1* | 2/2020 | Subba | H04L 9/3226 |
| 2020/0104101 | A1* | 4/2020 | Satpathy | G06F 7/588 |
| 2020/0193006 | A1* | 6/2020 | Krieg | H04L 9/3236 |
| 2020/0296128 | A1* | 9/2020 | Wentz | H04L 63/1433 |
| 2021/0026603 | A1* | 1/2021 | Wu | G06F 7/588 |
| 2021/0184871 | A1* | 6/2021 | Kim | H04L 9/3236 |
| 2022/0294644 | A1* | 9/2022 | Liu | H04L 9/3263 |
| 2023/0091028 | A1* | 3/2023 | Norrod | H04L 9/3263 713/189 |
| 2023/0096860 | A1* | 3/2023 | Cambou | H04L 9/0863 713/189 |
| 2023/0412401 | A1 | 12/2023 | White | |
| 2024/0187222 | A1* | 6/2024 | Lindskog | H04L 9/0866 |
| 2024/0396749 | A1* | 11/2024 | Chiang | H04L 9/0866 |
| 2025/0080366 | A1* | 3/2025 | Kim | G11C 7/062 |
| 2025/0365166 | A1* | 11/2025 | Krilakis | H04L 9/3278 |

* cited by examiner

PHYSICALLY UNCLONABLE FUNCTION (PUF) AUTHORITY FOR IDENTIFICATION TRUST IN COMMUNICATIONS WITH INTERNET OF THINGS (IoT) DEVICES

CROSS-REFERENCE TO RELATED APPLICATIONS

This application claims priority under 35 U.S.C. § 119(a) to Greek patent application No. 20240100378, filed on 21 May 2024, the entire teachings of which are incorporated herein by reference.

BACKGROUND OF THE INVENTION

Field of the Invention

The present invention relates to the technical field of hardware-based device security and more particularly to the use of a PUF in securing authenticity of a deployed device.

Description of the Related Art

Authentication is a term that refers to the process of proving that some fact or some document is genuine. In computer science, authentication typically refers to the assurance that a user is who the user claims to be. However, authentication in computer science is not limited to the end user and equally includes assuring the authenticity of an electronic file. Likewise, authentication includes assuring that a device has the identity asserted by the device.

There are many ways to perform authentication. The most conventional manner includes the use of credentials—an agreed piece of information shared between the user and the system. In many instances, credentials include a password and in oftentimes, a user identifier as well. More sophisticated modes of authentication include a second factor such as biometrics or out-of-band communication of a dynamically generated personal identification number (PIN). In those instances of human authentication, additional layers of process for authentication can be of little technical consequence. But, within the domain of device authentication, as the device acts autonomously from human intervention, most of these additional layers of process for authentication are not feasible.

To that end, device authentication customarily relied upon the question of a secret stored within memory of the device, or an inherent code included as part of the manufacture of the device, such as a media access control (MAC) identifier. Yet, simply relying upon the uniqueness of an inherent code for a device is not sufficient to protect the integrity of the device authentication process from a malicious actor having access to the inherent code of a device to be spoofed. As such, a more advanced process is required for such cases where authentication of a device is of paramount concern. PUF part of one such advanced process.

PUF refers to a "physical unclonable function" in reference to a physical object unable to be reproduced in physical way through the manufacture of an identical system using an identical technology. The PUF is then an analog to a biometric quality of a human and, as such, in response to a challenge to authenticity, an associated device can emit a physically defined "digital fingerprint" of the device that serves as a unique identifier, most often for a semiconductor device such as a microprocessor. PUFs are often based on unique physical variations occurring naturally during the manufacturing process as explained in U.S. Pat. No. 9,44,632 B2 to Pinkse et al., hereinafter "Pinske". In Pinske, a coherent light source emits coherent light at a physical portion of a device to be authenticated and in return, receives an optical response which can be compared to a previously stored optical response of an emission of a light source at the physical portion of the device. So long as the optical responses match, it can be assured that the device is the same device of the previously stored optical response.

PUF to date has been deployed only in connection with the authentication of a PUF configured device. However, in respect to secure computer communications with devices over a remote communications link, PUF has not found a role. In those instances, traditional modes of secure communication remain the mode of preference including secured shell (SSH) processing or transport layer security (TLS) processing. As it will be understood by one of skill in the art, both SSH and TLS are dependent upon the management of an X.509 certificate. Yet, the X.509 certificate also is widely understood to suffer from significant deficiencies both in implementation and use and cryptographically, the reliance upon a cryptographic hash function, exposes this sort of digital signature system to malicious exploitation.

BRIEF SUMMARY OF THE INVENTION

Embodiments of the present invention address technical deficiencies of the art in respect to securing communications with a remote disposed IoT device. To that end, embodiments of the present invention provide for a novel and non-obvious method for PUF enabling secure communications with a PUF enrolled device. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a method for PUF enabling secure communications with a PUF enrolled device includes directing a optical PUF unit to acquire a PUF response to an optical stimulus by the optical PUF unit directing the PUF unit to acquire a PUF response to an optical stimulus by the PUF unit onto a physical random medium portion of the PUF unit, for establishing secure communications, enrollment and identification of a device. The method additionally includes retrieving the PUF response from the PUF unit and generating a secure hash identifier (SHI) from the PUF response, from which a digital certificate may be created with the SHI. Finally, the method includes storing the SHI, digital certificate and PUF response in a record of a registry in connection with the device for use in a subsequent authentication of the device by a communicating client in order to establish a secure tunnel between the communicating client and the device. In this way, secure credentials can be maintained for the enrolled device according to the immutable and unclonable physical traits of the device without reliance on a formulaically generated cryptographic hash function.

In one aspect of the embodiment, the PUF unit is embedded in the device as part of the device. However, in an opposite aspect of the embodiment the PUF unit is separate from the device and not included as part of the device. In another aspect of the embodiment, the method additionally includes generating a certified hash identifier (CHI) from a serial number of the certificate, the SHI and a processor identifier of the device and storing the CHI in the registry for use in the subsequent authentication. In even yet another aspect of the embodiment, the method additionally includes modifying the record with revocation data responsive to a lapse of a threshold period of time without an attempt to validate the device.

In another embodiment of the invention, a data processing system is adapted for PUF enabling secure communications with a PUF enrolled device. The system includes a host computing platform of one or more computers, each with memory and one or processing units including one or more processing cores. The system also includes fixed storage defining a registry of authentication data for different PUF enrolled devices and a device selected for PUF enrollment in the registry. The system yet further includes a multiple optical PUF units in farm formation in data communication with the host computing platform. Finally, the system includes an enrollment module.

The enrollment module includes computer program instructions enabled while executing in the memory of at least one of the processing units of the host computing platform to direct the PUF unit to acquire a PUF response to an optical stimulus by the PUF unit onto a portion of the device to be enrolled for secure communications, and to retrieve the PUF response from the PUF unit to generate a SHI from the PUF response. The program instructions even further are enabled to create a digital certificate with the SHI. Finally, the program instructions are further enabled to store the SHI, digital certificate and PUF response in a record of the registry in connection with the device for use in a subsequent authentication of the device by a communicating client in order to establish a secure tunnel between the communicating client and the device.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for PUF enabled secure communications with a PUF enrolled device. In accordance with an embodiment of the invention, an enrollment service connects an IoT device for enrollment. In response to the connection of the IoT device, the enrollment service identifies the IoT device and directs a PUF unit for the device to acquire a PUF response to optical stimulation by the PUF unit upon a physical random medium portion of the PUF unit, for establishing secure communications, enrollment and identification of the IoT device, and install it to the IoT device. The enrollment service then computes an SHI from the PUF response and subsequently, the enrollment service generates a digital certificate with the SHI. Finally, the enrollment service returns the certificate to the selected IoT device and writes a record to a registry of the enrollment service in connection with the selected IoT device including the SHI, the PUF response and the certificate. The certificate may then be used to authenticate the selected IoT device for secure communications with other communicating devices.

Figure 1:
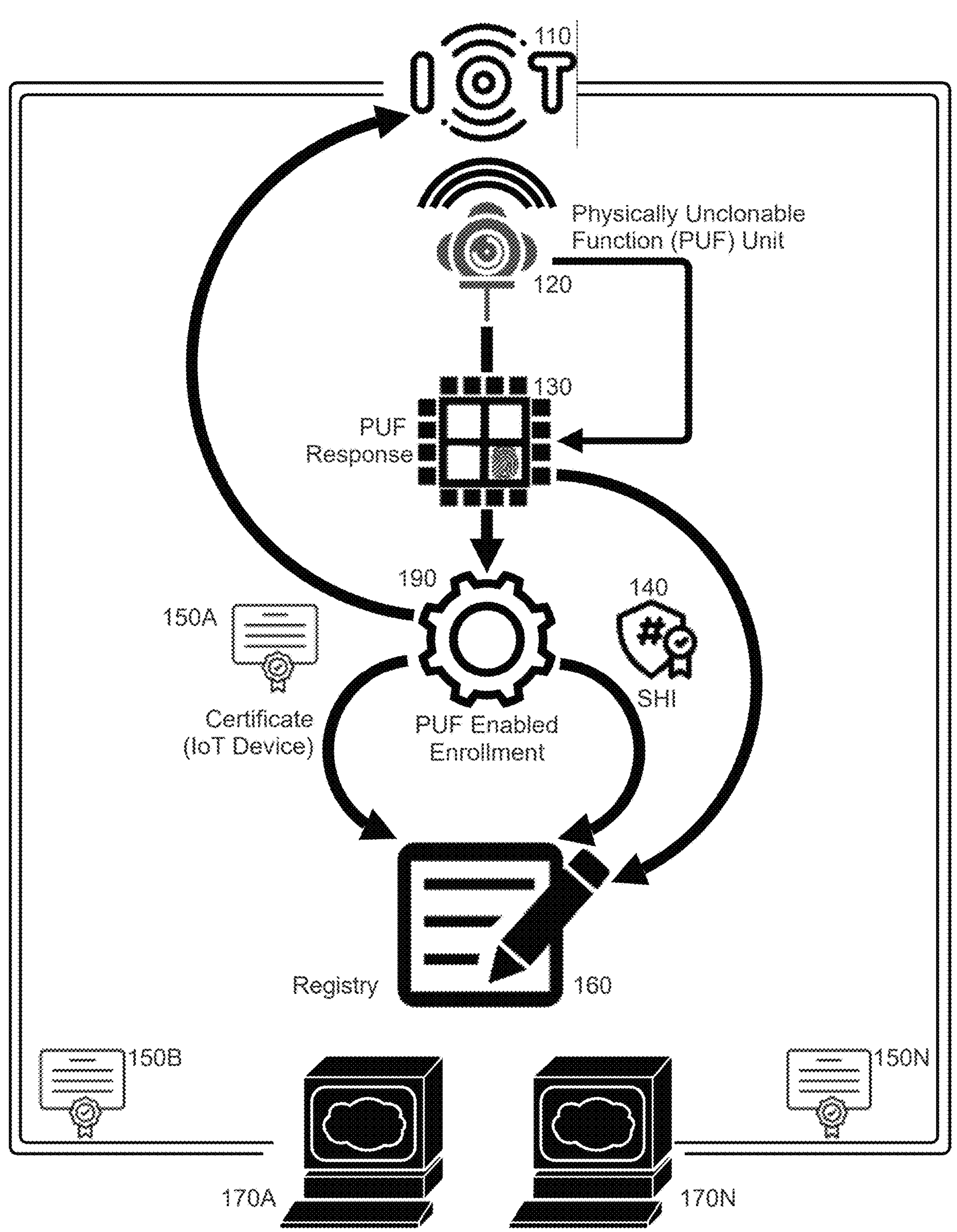
FIG. 1 is a pictorial illustration reflecting different aspects of a process of PUF enabling secure communications with a PUF enrolled device.

In illustration of one aspect of the embodiment, FIG. 1 pictorially shows a process of PUF enabling secure communications with a PUF enrolled device. As shown in FIG. 1, PUF enabled enrollment logic 190 directs a PUF unit 120 of an IoT device 110 to acquire a PUF response 130 to a stimulus imposed upon a target medium included as part of the IoT device 110 by the PUF unit 120, for instance an optical stimulus imposed upon an optical medium. The PUF enabled enrollment logic 190 then receives the PUF response 130 from the PUF unit 120 and uses the PUF response as a seed for computing the hash of an SHI 140. Thereafter, the PUF enabled enrollment logic 190 generates a digital certificate 150A with the SHI 140 and returns the certificate 150A to the IoT device 110 along with an authentication application (not shown) for storage therein.

Finally, the PUF enabled enrollment logic 190 writes a record to an enrollment registry 160. The record includes each of the PUF response 130, the SHI 140 and the digital certificate 150A. As such, third party devices 170A, 170N may establish secure communications with the IoT device 110 through an exchange of respective ones of different certificates 150B, 150N and the certificate 150A of the IoT device 110, which in of itself can be validated with reference to the registry 160.

Figure 2:
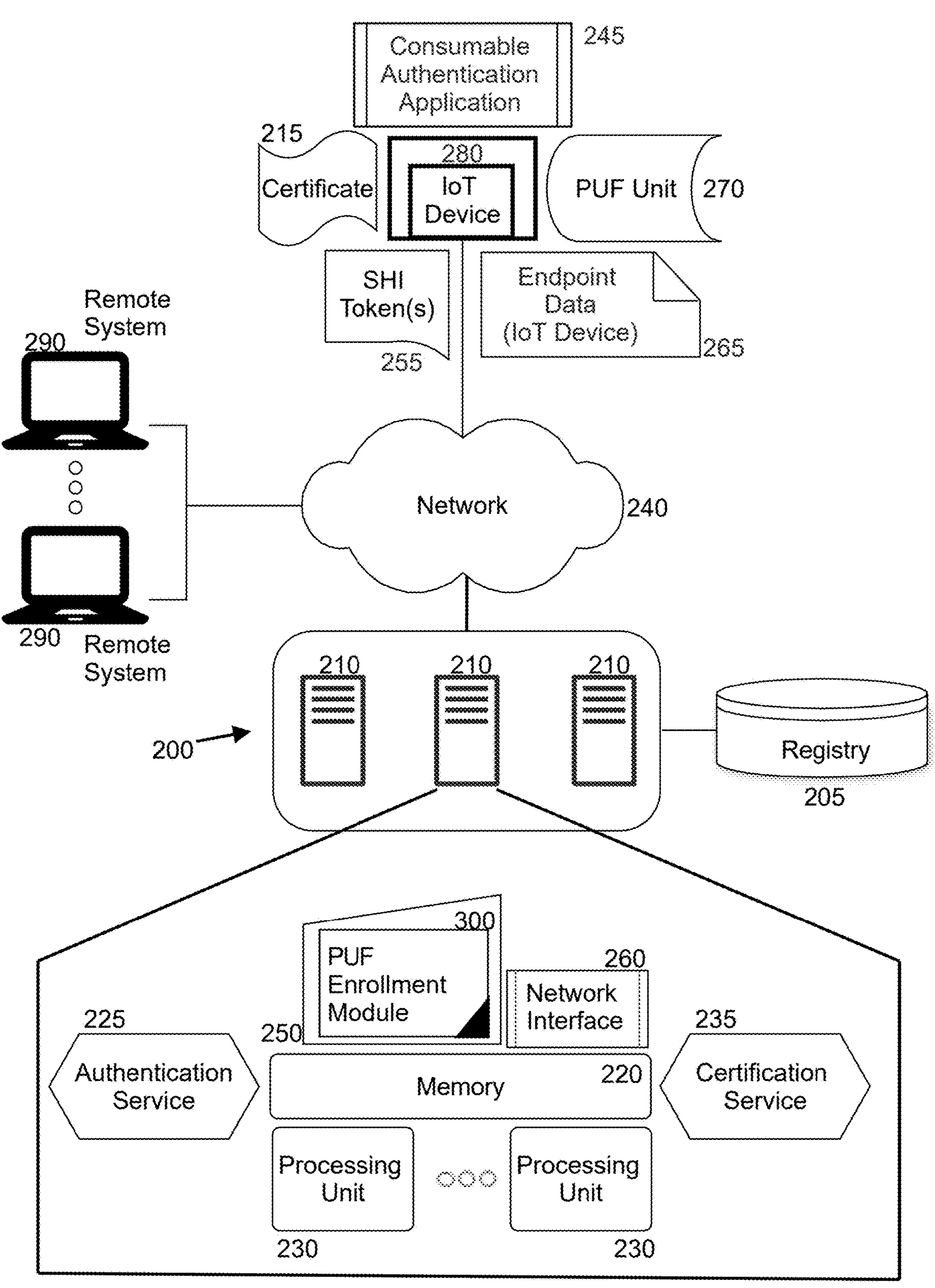
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to perform PUF enabling secure communications with a PUF enrolled device. In the data processing system illustrated in FIG. 1, a host computing platform 200 is provided. The host computing platform 200 includes one or more computers 210, each with memory 220 and one or more processing units 230. The host computer platform 200 is communicatively coupled over a data communications network 240 to an IoT device 280 that includes a PUF unit 270, either within the chassis of the IoT device 280, or separate from the IoT device 280.

The computers 210 of the host computing platform can be co-located within one another and in communication with one another over a local area network, or over a data communications bus, or the computers can be remotely disposed from one another and in communication with one another through network interface 260 over the data communications network 240. At least one of the computers 210 includes a computing device 250 including a non-transitory computer readable storage medium accessible by the processing units 230. The computing device stores 250 thereon or retains therein a program module 300 that includes computer program instructions which when executed by one or more of the processing units 230, performs a programmatically executable process for PUF enabling secure communications with a PUF enrolled device.

Specifically, the program instructions during execution transmit a directive over the data communications network 240 to the PUF unit 270 to acquire a PUF response to an optical stimulus emitted by the PUF unit 270 upon an optical medium for use by the IoT device 280. The program instructions further direct the PUF unit 270 to return the PUF response to the PUF enrollment module 300 for use in creating one or more SHI tokens 255 for the IoT device 280 from which the program instructions then generate a digital certificate 215 for the IoT device 280.

Optionally, the program instructions create a CHI (not shown) from at least one of the SHI tokens 255 using the digital certificate 215 and identifying data of one or more components of the IoT device 280 such as a serial number of the semiconductor chip. The program instructions then store each of the SHI tokens 255, CHI (not shown), digital certificate 215 and the PUF response into a registry 205 for subsequent retrieval during a certification process for the IoT device 280. Finally, the program instructions yet further store an authentication application 245 into firmware of the IoT device 280 for use in performing authentication of the IoT device 280 utilizing stored endpoint data 265 of the IoT device 280.

Of note, additional service logic 225, 235 can be included with the host computing platform 200. In this regard, the host computing platform 200 can include an authentication service 225 enabled to mediate authentication of the IoT device 280 by reproducing the SHI tokens 255 and digital certificate 215 for the IoT device 280 using a newly acquired PUF response from the PUF unit 270 and comparing the SHI tokens 255 and digital certificate (and PUF response) to that stored in connection with the IoT device 280 in the registry 205. Likewise, certification service 235 logic can maintain currency of the registration of the digital certificate 215 by automatically invalidating the digital certificate 215 subsequent to a threshold lapse of time during which no request to authenticate the IoT device 280 has been received.

Figure 3:
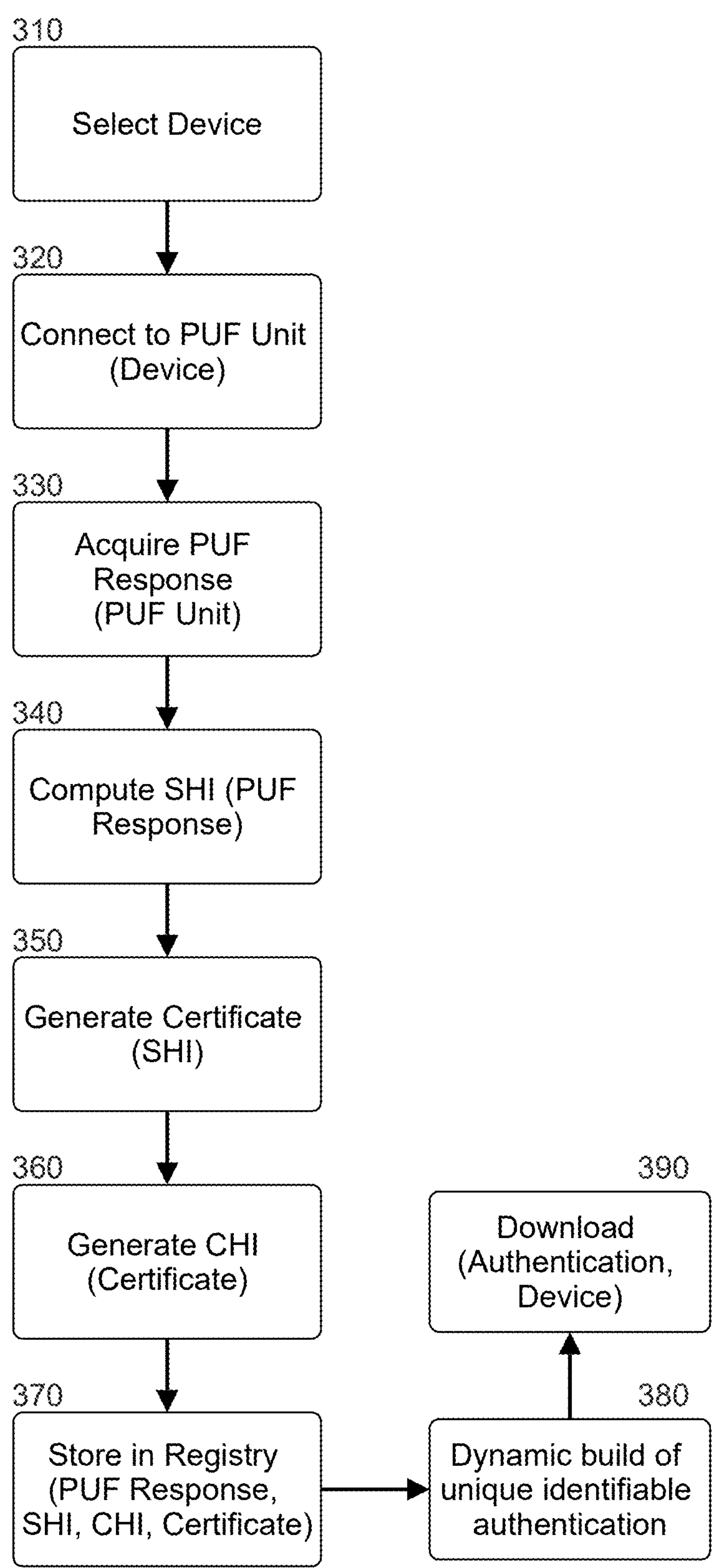

In further illustration of an exemplary operation of the module, FIG. 3 is a flow chart illustrating one of the aspects of the process of FIG. 1. Beginning in block 310, an enrollment process selects an IoT device for enrollment with a registry of PUF secured devices. In block 320 a communicative connection is established with a PUF unit either included within the IoT device or positioned proximate to the IoT device. In block 330, the PUF unit acquires a PUF response to the emission of a stimulus upon a portion of the IoT device and provides the PUF response to the enrollment process. In this regard, in an electrical stimulus solution, a PUF unit remote from the IoT device can issue an electronic query to a counterpart PUF module onboard the IoT device, and the counterpart PUF unit responds with a unique identifier of a processor of the IoT device. Alternatively, in an optical stimulus solution, the onboard PUF module emits an optical stimulus upon an optical portion of the IoT device in order to return an optical response value.

In either circumstance, the enrollment process then computes one or more SHI tokens in block 340 with the PUF response as a hash seed and in block 350, the enrollment process generates a digital certificate for the IoT device with the SHI tokens. In block 360, the enrollment process further generates a CHI with the digital certificate and identifying data for an electronic component of the IoT device. Thereafter, in block 370 the enrollment process stores each of the PUF Response, SHI tokens, CHI and digital certificate into a registry in connection with the IoT device. Finally, in block 380 a unique, identification authentication value is computed for the IoT device and the authentication value is downloaded to the IoT device in block 390.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for physically unclonable function (PUF) enabling secure communications with a PUF enrolled device, the method comprising:

directing a PUF unit to acquire, a PUF response to an optical stimulus by the PUF unit onto a physical random medium of the PUF unit, for establishing secure communications, enrollment and identification of a device;

retrieving the PUF response from the PUF unit and generating a secure hash identifier (SHI) from the PUF response;

creating a digital certificate with the SHI; and, storing the SHI, digital certificate and PUF response in a record of a registry in connection with the device for use in a subsequent authentication of the device by a communicating client in order to establish a secure tunnel between the communicating client and the device.

2. The method of claim 1, wherein the PUF unit is embedded in the device as part of the device.

3. The method of claim 1, wherein the PUF unit is separate from the device.

4. The method of claim 1, further comprising generating a certified hash identifier (CHI) from a serial number of the certificate, the SHI and a processor identifier of the device and storing the CHI in the registry for use in the subsequent authentication.

5. The method of claim 1, further comprising modifying the record with revocation data responsive to a lapse of a threshold period of time without an attempt to validate the device.

6. A data processing system adapted for physically unclonable function (PUF) enabling secure communications with a PUF enrolled device, the system comprising:

a host computing platform comprising one or more computers, each with memory and one or processing units including one or more processing cores;

fixed storage defining a registry of authentication data for different PUF enrolled devices;

a device selected for PUF enrollment in the registry;

a PUF unit in optical communication with the device and in data communication with the host computing platform; and, an enrollment module comprising computer program instructions enabled while executing in the memory of at least one of the processing units of the host computing platform to perform:

directing the PUF unit to acquire a PUF response to an optical stimulus by the PUF unit onto a physical random medium portion of the PUF unit, for establishing secure communications, enrollment and identification of a device;

retrieving the PUF response from the PUF unit and generating a secure hash identifier (SHI) from the PUF response;

creating a digital certificate with the SHI; and, storing the SHI, digital certificate and PUF response in a record of the registry in connection with the device for use in a subsequent authentication of the device by a communicating client in order to establish a secure tunnel between the communicating client and the device.

7. The system of claim 6, wherein the PUF unit is embedded in the device as part of the device.

8. The system of claim 6, wherein the PUF unit is separate from the device.

9. The system of claim 6, wherein the program instructions further perform generating a certified hash identifier (CHI) from a serial number of the certificate, the SHI and a processor identifier of the device and storing the CHI in the registry for use in the subsequent authentication.

10. The system of claim 6, wherein the program instructions further perform modifying the record with revocation data responsive to a lapse of a threshold period of time without an attempt to validate the device.

11. A computing device comprising a non-transitory computer readable storage medium having program instructions stored therein, the instructions being executable by at least one processing core of a processing unit to cause the processing unit to perform a physically unclonable function (PUF) enabling secure communications with a PUF enrolled device, by:

directing a PUF unit to acquire a PUF response to an optical stimulus by the PUF unit onto a physical random medium portion of the PUF unit, for establishing secure communications, enrollment and identification of a device;

retrieving the PUF response from the PUF unit and generating a secure hash identifier (SHI) from the PUF response;

creating a digital certificate with the SHI; and, storing the SHI, digital certificate and PUF response in a record of a registry in connection with the device for use in a subsequent authentication of the device by a communicating client in order to establish a secure tunnel between the communicating client and the device.

12. The device of claim 11, wherein the PUF unit is embedded in the device as part of the device.

13. The device of claim 11, wherein the PUF unit is separate from the device.

14. The device of claim 11, wherein the instructions cause the processing unit to additionally perform generating a certified hash identifier (CHI) from a serial number of the certificate, the SHI and a processor identifier of the device and storing the CHI in the registry for use in the subsequent authentication.

15. The device of claim 11, wherein the instructions cause the processing unit to additionally perform modifying the record with revocation data responsive to a lapse of a threshold period of time without an attempt to validate the device.

* * * * *